May 9, 1933. C. E. VAN NORMAN 1,908,577
OSCILLATING GRINDER
Filed April 19, 1928
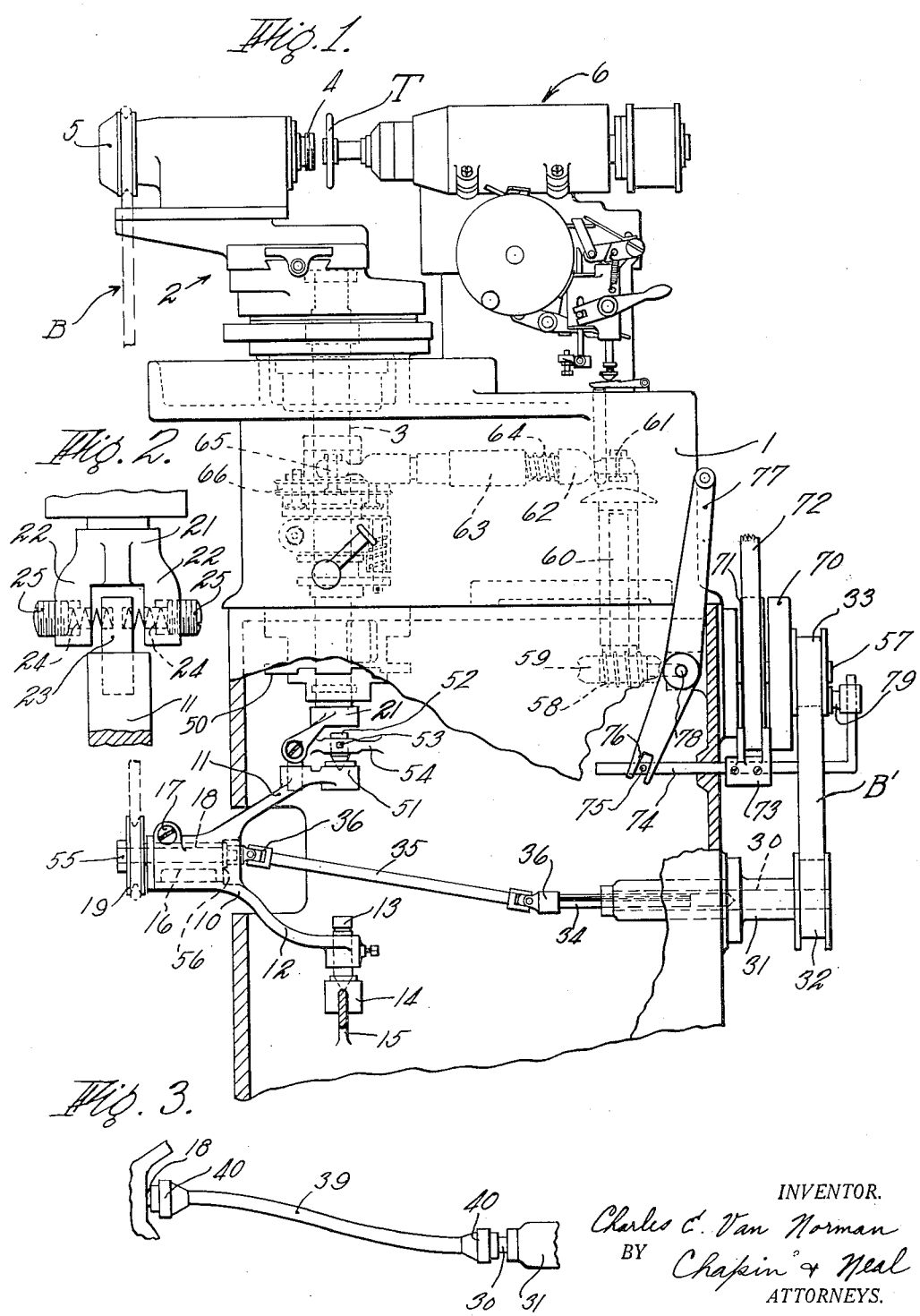
INVENTOR.
Charles E. Van Norman
BY Chapin & Neal
ATTORNEYS.

Patented May 9, 1933

1,908,577

UNITED STATES PATENT OFFICE

CHARLES E. VAN NORMAN, OF SPRINGFIELD, MASSACHUSETTS, ASSIGNOR TO VAN NORMAN MACHINE TOOL COMPANY, OF SPRINGFIELD, MASSACHUSETTS, A CORPORATION OF MASSACHUSETTS

OSCILLATING GRINDER

Application filed April 19, 1928. Serial No. 271,335.

This invention relates to precision machines such as grinders in which one head, for instance that carrying the work to be ground, is caused to oscillate relative to the tool head so that the ground surface is concave or convex. One object is to provide an oscillating work head which may be stopped in any desired angular position. Another object is to provide a simple and efficient driving mechanism for rotating the work, so arranged as to prevent the transmission of vibrations to the work. In certain aspects, my present invention is an improvement on the machine shown in my prior application Serial No. 105,458, filed April 29, 1926.

Referring to the drawing:

Fig. 1 is a side elevation, partly broken away, of a grinding machine embodying my invention;

Fig. 2 is an end elevation, on a larger scale, of certain parts shown in Fig. 1; and Fig. 3 is a detail of a modified form of driving mechanism.

The machine is supported upon a heavy base 1, at one side of which is a work head 2 carried upon a vertical pivot shaft 3 mounted in suitable bearings 50 in the frame. A work holder or chuck 4 is carried rotatably in the work head at one end of a spindle, the other end of which carries a belt pulley 5. Positioned below the oscillating work head is an oscillating bearing 10 having forked arms 11 and 12. Arm 12 bears a pivot 13 bearing on a support 14 carried on a bracket 15 projecting from the base 1. Arm 11 has a bearing portion 51 in which fits a pivot 52 held by a set screw 53 in a bracket 54 also carried by the base 1. It will be observed that the oscillating bearing 10 is supported in the base 1 by brackets unconnected with the bearings 50, so that any vibrations arising in or imparted to the bearing 10 will be absorbed by the heavy base 1 and will not be transmitted to the work head by the pivot shaft 3.

The bearing 10 contains an adjustably rotatable eccentric bushing 16 clamped in place by a screw 17 and supporting a short shaft 18 held by suitable collars 55 and 56 against endwise movement but free to rotate. A pulley 19 is secured to the outer end of this eccentrically supported shaft and is joined by a belt B to the pulley 5, previously mentioned. By rotating the eccentric bearing, which is then held in position by the screw 17, the belt B can be tightened as desired. The shaft 18 is driven by means to be described and is oscillated through bearing 10 in synchronism with the work head 2. For this purpose, the vertical pivot shaft 3 is provided at its lower end with a crank member 21 having lugs 22 between which lies a pin 23 secured in the arm 11 of the bearing 10. Springs 24, held in recesses in the lugs 22 by screw plugs 25, engage other recesses in the pin to maintain the pin 23 in cushioned engagement with the crank 21.

A shaft 30 is mounted in a bearing 31 at one side of the base, and carries a pulley 32 joined by a belt B' with a pulley 33 on the main drive shaft 57. The end of shaft 30 remote from the pulley is bored out to receive a shaft 34 having a running key engagement therewith, so that the two shafts may slide axially while always rotating together. A rod 35, having universal joint connections 36 with the shafts 34 and 18, permits rotation to be imparted to the latter shaft whatever the angular position of the bearing 10. Instead of using this method, a flexible shaft 39 may be joined at its ends to shafts 18 and 30, as indicated in Fig. 3.

The shaft 57 carries a worm 58 meshing with a worm wheel 59 on a vertical shaft 60 mounted in suitable bearings in the base. At its upper end this latter shaft has an adjustable pivot 61 for a two part connecting rod 62, 63 joined by a spring 64. A pivot 65 at the end of part 63 of the connecting rod is held in a plate 66 coupled by certain, preferably releasable, devices to the vertical pivot shaft 3. Various details of this part of the apparatus are shown in my prior application Serial No. 105,458, and in my Reissue Patent 13,892, dated March 16, 1915. The mechanism is only important here to show generally the connection between the drive shaft 57 and the pivot shaft 3 whereby the latter may be oscillated.

On shaft 57 is a tight pulley 70 and a loose pulley 71 over which may pass a belt 72 from any suitable source of power. A belt shifter 73 is carried upon a rod 74 slidably mounted in suitable journals in the frame and carrying a pin 75 embraced by the forked end 76 of a handle 77 pivoted to the base at 78. The end of rod 74 is bent and supports a brake shoe 79 positioned so as to contact the pulley 33 when the belt shifter is placed to guide the belt 72 onto the loose pulley 71.

When it is desired to stop the machine, the handle 77 is operated to move the belt shifter and brake into the positions shown in Fig. 1. The shifting of the belt to the loose pulley removes the power, while the brake shoe, being pressed against the pulley with a force determinable by the operator, enables the machine to be stopped with the work head 2 in any desired angular position. The head can thus be stopped in a position where the work is accessible for gauging or removal, without lost time and without the necessity for repeated running of the machine through a cycle of oscillation when the head initially overtravels the position desired.

What I claim is:

1. In a machine of the class described comprising a heavy base, a work head oscillatable upon a bearing in the base, a work holder rotatably mounted in the work head, a belt pulley secured to the work holder for rotation therewith, a belt pulley oscillatable in bearings in the base separate from the bearings for the work head, means for oscillating the work head and said second belt pulley in unison, a belt connecting the two pulleys, a drive shaft, and a flexible shaft joining the drive shaft and said second belt pulley to transmit rotary motion to the pulley in all angular positions thereof.

2. In a machine of the class described, a base, a work head mounted for oscillation upon bearings in the base, a work holder rotatably mounted in the work head, a belt pulley secured to the work holder for rotation therewith, a main drive shaft, connections between the drive shaft and the work head for oscillating the latter, a belt pulley oscillatable in bearings in the base separate from the bearings for the work head, a belt joining the two pulleys, means for oscillating the second belt pulley in unison with the work head, a shaft parallel to the main drive shaft, belt and pulley connections between said shaft and the main drive shaft, a universally flexible shaft connection between said shaft and the oscillatable belt pulley, a tight and a loose pulley on the drive shaft, a belt shifter for moving a drive belt to either of said pulleys, and a brake operable by the belt shifter when the drive belt is on the loose pulley for stopping the rotation of the drive shaft.

3. In a machine of the class described, a base, a work head oscillatable upon bearings in the base, a work holder rotatably mounted in the work head, a belt pulley mounted on the work holder for rotation therewith, a rotatable shaft oscillatably supported in the base, the axis of said shaft being substantially parallel to the axis of rotation of the work holder, a belt pulley mounted on said shaft for rotation therewith, a belt connecting the two pulleys, means for oscillating the work head and shaft in unison, means for rotating said shaft, and belt tensioning means associated with the shaft whereby the relative axial distance between the work holder and said shaft pulley may be varied.

4. In a machine of the class described, a base, a work head oscillatable upon bearings in the base, a work holding spindle rotatably mounted on the work head, a rotatable driving member supported for oscillation in a lower portion of the base, means for delivering driving power to the driving member, driving connections between said member and spindle for rotating the work spindle, means for oscillating the work head, and connecting mechanism transmitting oscillatory movement from the work head to the lower driving member, the said connecting mechanism including cushioning elements to prevent the transmission of vibrations therethrough from the driving member to the work head.

5. In a machine of the class described, a base, a work head mounted for oscillation upon a bearing in the base, a work holder rotatably mounted in the work head, a belt pulley secured to the work holder for rotation therewith, a main drive shaft, connections between the drive shaft and the work head for oscillating the latter, a tight and loose pulley on the drive shaft, driving connections between said tight pulley and work holder pulley, and including a member pivotally supported in the base on an axis parallel with the axis of oscillation of the work head, means for oscillating said member in unison with the work head, a slidable member adapted for movement substantially parallel with the axis of the drive shaft, a belt shifter operatively secured to said member, a projecting brake member on said slidable member, means for actuating said slidable member to thereby shift the belt to the loose pulley and thereby discontinue the driving function, and to simultaneously retard both the rotation and the oscillatory movement of the work holder.

In testimony whereof I have affixed my signature.

CHARLES E. VAN NORMAN.